(No Model.)
W. W. JACQUES.
SYSTEM OF ELECTRICAL COMMUNICATION.
No. 246,887. Patented Sept. 13, 1881.
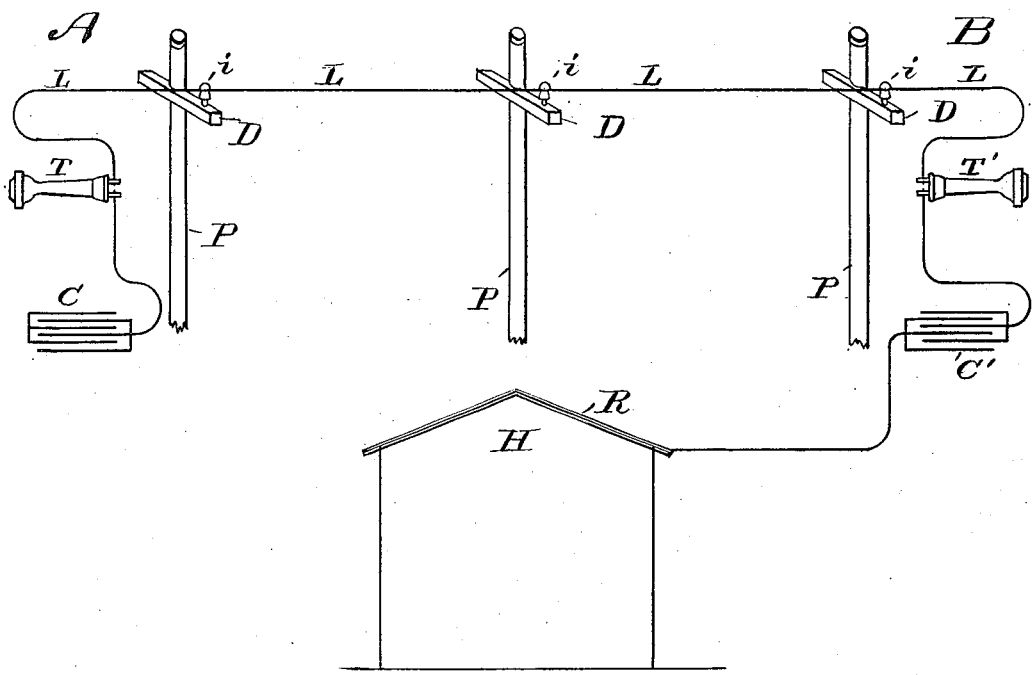
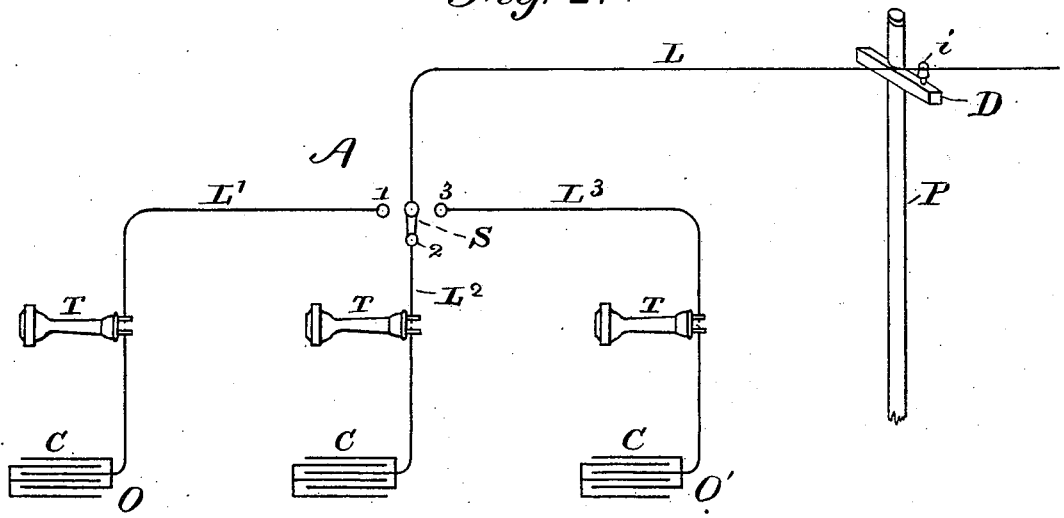
Witnesses.
J. B. Henck, Jr.
Thomas D. Lockwood
Inventor,
William W. Jacques.

UNITED STATES PATENT OFFICE.

WILLIAM W. JACQUES, OF BOSTON, MASSACHUSETTS.

SYSTEM OF ELECTRICAL COMMUNICATION.

SPECIFICATION forming part of Letters Patent No. 246,887, dated September 13, 1881.

Application filed May 27, 1881. (No model.)

*To all whom it may concern:*

Be it known that I, WILLIAM W. JACQUES, of Boston, in the county of Suffolk and State of Massachusetts, have invented certain Improvements in Systems of Electrical Communication, of which the following is a specification.

My invention relates to improvements in electrical circuits and conductors, and has for its objects the avoidance of the electrical disturbances incident to the use of the ground when employed as a means of completing the circuit of a line of electrical communication, and also the avoidance of similar disturbances which originate from the passage of any extraneous currents, which take the electric wires as a ready and easy path to the earth.

Experience has demonstrated that all lines constructed for electrical correspondence, except metallic circuits, are affected by earth-currents, which vary considerably in strength and direction at different hours of the day and night, although at no time are the wires totally free from their influence. These currents are chiefly caused by the connection formed by the wire between different portions of the earth's surface having different electrical potentials, and they interfere with the proper working of the line to a considerable extent. When the receiving-instrument of such conducting-wires is of very delicate construction, responding readily to slight changes or variations of current—such, for example, as a telephone—the disturbances so caused, as also the disturbances due to the extraneous currents hereinbefore referred to, become a source of serious annoyance and inconvenience. They manifest themselves by a confused murmur which is heard in the telephone, and which becomes at times so intense as to be intolerable. It then drowns and confuses conversation which is being carried on, rendering it impossible to understand the words which are transmitted on the telephone-line. These interposing currents may and have heretofore been prevented from entering and flowing in the circuits by the employment of a second wire returning to the originating-station, thus forming the circuit entirely of wire, and rendering the introduction of the earth into the circuit and its employment as a return entirely unnecessary. This plan has, however, certain disadvantages.

The use of a metallic circuit or wire return in lieu of the employment of the earth in that capacity necessarily implies double the cost for line-wire and a double amount of labor in stringing the same. Moreover, in view of the fact that nearly all ordinary lines are ground-circuit lines, it is evident that the act of connecting an ordinary grounded circuit to each end of a metallic circuit would in effect reduce the entire system once more to a grounded circuit, thus annulling all the advantages previously gained.

By my inventions these evils are obviated. To that end, instead of connecting the line-wire to the ground at each terminal, I connect it to one side of a large condenser, the other side of which is either left entirely open and insulated, or else is connected to a large mass or surface insulated from the earth—such, for example, as a tinned roof.

The following description of my invention will enable those skilled in the art to which it appertains to apply and use it, reference being had to the accompanying drawings, which form a part of this specification, and in which the several figures represent dispositions of the circuits in accordance therewith.

In Figure 1 is shown a telephone-line, L, to which my invention is applied at each of the two terminal stations A and B, the mode of application at A differing slightly from that employed at B. Fig. 2 exhibits the arrangement of circuits at a terminal station, showing the mode of connecting a trunk telephone-line provided with my invention to the several short wires radiating from the said terminal station.

In Fig. 1, L is the line-wire, supported as frequently as may be necessary by the insulators i, fixed on the cross-arms D of the poles P. It is shown as terminating in one plate or series of plates of a condenser, C, at one station, A, after passing through the coil of the necessary instruments, which in this case are represented by the telephone T; the opposing plates of the condenser being left completely insulated or unattached to any conductor. At the other terminal station, B, of the line L the connections are similarly made, the only variation being that in this case I have shown the opposite series of condenser-plates connected to the roof R of the house H, the object to be gained being a largely-increased surface or mass, and a corresponding increase in the capacity of the condenser. No connection at either end is made with the earth.

In Fig. 2 the incoming line L, arriving at the central station, A, is connected by the switch S through the wire $L^2$ to the telephone and ungrounded condenser C. $L'$ and $L^3$ are branch lines, which may, of course, be indefinitely increased in number, be of any desired length, and be constructed to any desired point. Each branch line likewise terminates at the several stations $o$ $o'$ in a condenser or similar reservoir of electricity having its opposite side insulated or connected to any convenient surface of metal or other conducting material of considerable size. These branches may, in a telephone-exchange system, represent the several subscribers' lines, and by means of the usual switches or circuit-changers may readily be connected to the main line L or to one another.

Although the instruments are in each drawing represented as telephones, my invention may be applied in a similar manner and with equal facility to lines furnished with any form of instrument operated by currents of electricity, such application being only limited by the degree of delicacy of operation possessed by the instruments so employed.

I am aware that receiving-telephones have been constructed which operate by the attraction between two or more plates of metal, which bear to one another the relation of two plates of a condenser, such attraction being caused by a static charge of electricity communicated to one of the plates, and that in such telephones the opposite plate has been either completely insulated or connected to a mass of metal, and I do not claim any such combination. My invention is essentially different, in that no special form of telephone is necessary.

I have obtained good results, both as regards distinct articulate speech and freedom from earth-current disturbances, from the hereinbefore-described arrangement by the use of condensers having a capacity of nine microfarads, and telephonic transmission is completely practicable when condensers are employed having a much smaller capacity. It will be found, however, in practice that the transmitted signals or sounds increase in volume and distinctness as the capacity of the condenser is increased.

It is perfectly practicable and may in some cases be desirable to connect branch lines to a main line terminated in the manner described by looping them from the main line at a point or points between the terminals of said main line. This being an obvious and self-evident arrangement, I have not considered it as necessary to be delineated in the drawings.

What I claim as my invention, and desire to secure by Letters Patent, is—

1. In a line for electric signaling or communication, the line-wire having electrical receiving-instruments connected therein, and being itself connected with a condenser of which one side is insulated or connected with an insulated conductive mass and the other with the said line-wire, substantially as described.

2. At the terminal stations of a telegraph or telephone line, the combination of a telephone or other receiving-instrument adapted to be operated by a current or currents of electricity with a condenser one side of which is connected through the said receiving-instrument to the line-conductor, the other being completely insulated or connected to an insulated mass or surface of metal or other conducting material.

3. The combination, in a telephone-exchange system, of a main line unconnected with the ground, a condenser one side of which is connected to the said main line, the other side being insulated or connected to an insulated conducting mass or surface, a series of branch or subscribers' lines each similarly provided with and terminating in a condenser, which is connected in the manner indicated, and the subscribers' telephones or receiving-instruments in said branch circuits, substantially as set forth.

In testimony whereof I have signed my name to this specification, in the presence of two subscribing witnesses, this 24th day of May, 1881.

WILLIAM W. JACQUES.

Witnesses:
J. B. HENCK, Jr.,
THOS. D. LOCKWOOD.